UNITED STATES PATENT OFFICE.

ALEXANDER L. STRAUS, OF BALTIMORE, MARYLAND, ASSIGNOR TO BALTIMORE PROCESS COMPANY, A CORPORATION OF MARYLAND.

COMPOSITION OF MATTER.

1,354,585.

Specification of Letters Patent.

Patented Oct. 5, 1920.

No Drawing. Application filed July 30, 1919. Serial No. 314,204.

*To all whom it may concern:*

Be it known that I, ALEXANDER L. STRAUS, a citizen of the United States, residing at Baltimore, in the State of Maryland, have invented certain new and useful Improvements in Composition of Matter; and I do hereby declare the following to be a full, clear, and exact description of the invention, such as will enable others skilled in the art to which it appertains to make and use the same.

This invention relates to compositions of matter especially adapted for adding to the kettle during the operation of boiling out the alcoholic contents of fermented malt beverages in order to restore the original taste and flavor of said beverages, and has for its object to provide a mixture of ingredients which will enable the brewer to boil the alcohol from his beer, and immediately restore the flavor thereof, all in a manner less costly and more expeditious than has been heretofore proposed.

With these objects in view the invention consists in the novel mixture of ingredients hereinafter disclosed and particularly pointed out in the claims.

In order that the precise invention may be the more clearly understood it is said:—

In my Reissue Patent #14391, dated Nov. 6, 1917, and entitled Process for making a non-alcoholic beverage, I have described a process of producing a non-alcoholic beer having the same taste as the original beer, and which consists in making beer according to the usual methods, boiling off the alcohol content of the beer, and adding to the beer certain ingredients in specified proportions.

According to the present invention, the same process of making the beer and of boiling it off is carried out, but instead of adding all the ingredients as specified, in said reissue patent, according to this invention, I make a mixture of ingredients specified in said patent, leaving out the hops, which are to be added by the brewer, and I add certain other ingredients as will appear below.

This mixture of ingredients, made the subject of this application, I make up into a package of say 25 pounds, which I ship to the brewer and instruct him to add it to say 100 barrels of beer in the kettle, and say one half hour before the end of the boiling operation. With this said mixture of ingredients, in the kettle, and with the hops that the brewer himself is to add, the brewer is enabled to produce a non-alcoholic beer having all the original taste of the beer as will now appear. Accordingly, in carrying out this invention, I take say 10 pounds of sodium chlorid, 10 pounds of gum arabic or equivalent foam producing material such for example as gum tragacanth or dextrin, I further take 3 pounds of granulated sugar or other suitable equivalent sweetening material, for this purpose I take one pound of potassium meta-sulfite, known to the trade as K. M. S. or kalium meta-sulfite tablets, I take one pound of citric acid, and 2 ounces of lupulin or equivalent bitter tasting material, such as tannin or quassia. By the term bitter tasting material found in the claims, I mean one or more of these last mentioned bitter tasting substances, or other equivalent for this purpose.

In case the tannin is used two ounces thereof will substitute for two ounces of lupulin, but in case quassia is used one half ounce of the same will serve the same purpose as 2 ounces of lupulin.

I mix these ingredients thoroughly in a finely divided state, and as they make up a package weighing a little over 25 pounds, I sell the package to the brewer with the instructions above mentioned, whereupon a high quality of beer, which can scarcely be detected from the original beer is produced.

I should state that the object of the citric acid is to give a snappy flavor to the beer, without destroying its original flavor, and the object of the lupulin is to enhance the flavor which is restored by the citric acid and other ingredients. In other words, as is well known, fermented malt beer or other beverages such as ale, etc., contain a considerable proportion of albumins, these albumins during the boiling operation become cooked just as the white of an egg will become cooked, after boiling, and not only the flavor of these albumins is thus changed but the flavor of other constituents of the beer is likewise changed during the boiling operation.

I have discovered that the addition of the salt, and sugar contained in the above mentioned mixture, together with the hops specified in said reissue patent, will serve in a great measure to restore the original flavor of the beverage. But, when all the other ingredients are added to the beer, just before the end of the boiling operation, I find that it is very difficult indeed, even for experienced beer drinkers to detect the difference in flavor between the non-alcoholic beer and the original beer.

It is obvious that those skilled in the art may vary the proportions as well as the ingredients of my novel mixture, and therefore, I do not wish to be limited to the above disclosure except as may be required by the claims.

What I claim is:—

1. The herein described composition of matter to be added to malt beverages after substantially all their alcoholic contents have been boiled off, in order to restore the taste of the original beverage, the same consisting of a mixture containing sodium chlorid; a foam producing material, a carbohydrate sweetening material, meta-bi-sulfite of potassium, citric acid in a quantity sufficient to impart a snappy flavor to the beverage and a bitter tasting material, substantially as described.

2. The herein described composition of matter to be added to fermented malt beer after substantially all its alcohol has been boiled off, the same containing substantially equal quantities of sodium chlorid and a foam producing material, substantially one third as much carbohydrate sweetening material as there is sodium chlorid present, and one tenth as much meta-bi-sulfite of potassium as there is sodium chlorid present, said mixture also containing sufficient citric acid to impart a pungent flavor, and a bitter tasting material, substantially as described.

3. The herein described composition of matter to be added to fermented malt beer after substantially all its alcohol has been boiled off in order to restore the taste and flavor of the original beer, the same substantially consisting of the following ingredients in substantially the following proportions, sodium chlorid 10 pounds, gum arabic 10 pounds, sugar 3 pounds, potassium meta-bi-sulfite 1 pound, citric acid 1 pound, lupulin, 2 ounces, substantially as described.

In testimony whereof I affix my signature in presence of two witnesses.

ALEXANDER L. STRAUS.

Witnesses:
M. BOWEN,
H. KELLY.